US009377838B2

(12) United States Patent
Shouno

(10) Patent No.: US 9,377,838 B2
(45) Date of Patent: Jun. 28, 2016

(54) DATA PROCESSING APPARATUS AND POWER SAVING CONTROL METHOD WHEN TRANSITING TO A POWER SAVING STATE

(75) Inventor: Hiroki Shouno, Asahikawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 386 days.

(21) Appl. No.: 13/368,974

(22) Filed: Feb. 8, 2012

(65) Prior Publication Data

US 2012/0216061 A1     Aug. 23, 2012

(30) Foreign Application Priority Data

Feb. 17, 2011   (JP) .................................. 2011-032631

(51) Int. Cl.
*G06F 1/00* (2006.01)
*G06F 1/32* (2006.01)
*G06F 1/26* (2006.01)

(52) U.S. Cl.
CPC ................ *G06F 1/3209* (2013.01); *G06F 1/26* (2013.01); *G06F 1/3203* (2013.01); *G06F 1/3215* (2013.01); *G06F 1/3278* (2013.01); *G06F 1/3284* (2013.01); *Y02B 60/1267* (2013.01)

(58) Field of Classification Search
CPC ....... G06F 1/32; G06F 1/3203; G06F 1/3209; G06F 1/3215; G06F 1/3278
See application file for complete search history.

(56) References Cited

U.S. PATENT DOCUMENTS

| 8,689,025 B2* | 4/2014 | Attar et al. .................... 713/320 |
| 2005/0007628 A1* | 1/2005 | Yamano et al. .............. 358/1.15 |
| 2006/0010331 A1* | 1/2006 | Ohara .......................... 713/323 |
| 2006/0084407 A1* | 4/2006 | Li ........................ H04B 1/1615 455/343.1 |
| 2008/0297837 A1* | 12/2008 | Soda ..................... G06K 15/005 358/1.15 |
| 2010/0167792 A1* | 7/2010 | Chen et al. .................... 455/566 |
| 2010/0322124 A1* | 12/2010 | Luoma et al. ................. 370/311 |
| 2011/0078465 A1* | 3/2011 | Ito .......................... G06F 1/3203 713/300 |
| 2011/0154475 A1* | 6/2011 | Wu ........................ G06F 1/3209 726/13 |

FOREIGN PATENT DOCUMENTS

| CN | 1499339 A | 5/2004 |
| CN | 101520745 A | 9/2009 |
| JP | 2006-025212 A | 1/2006 |
| JP | 2008-009875 A | 1/2008 |
| JP | 2010-079729 A | 4/2010 |
| JP | 2010-283696 A | 12/2010 |

OTHER PUBLICATIONS

Chinese Office Action issued in corresponding application No. 201210037024.5 on Apr. 30, 2014.

* cited by examiner

*Primary Examiner* — Thomas Lee
*Assistant Examiner* — Zhipeng Wang
(74) *Attorney, Agent, or Firm* — Carter, DeLuca, Farrell & Schmidt, LLP

(57) ABSTRACT

Reception of data by an operating system via a network is monitored outside of the operating system. When reception of a packet to which the operating system of a data processing apparatus should respond is detected, transition to a power saving state is deferred.

13 Claims, 5 Drawing Sheets

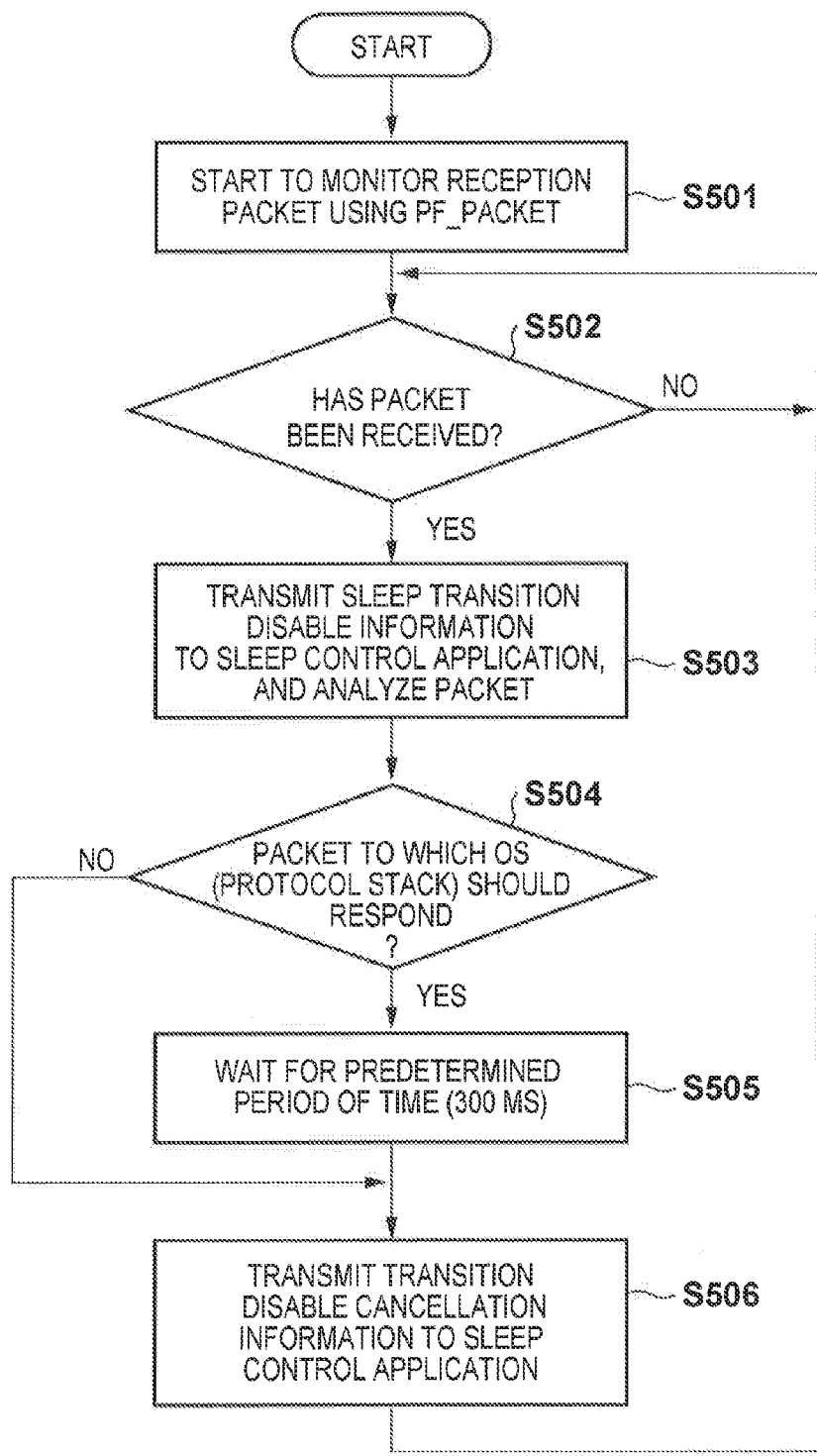

DATA PROCESSING APPARATUS AND POWER SAVING CONTROL METHOD WHEN TRANSITING TO A POWER SAVING STATE

BACKGROUND OF THE INVENTION

1. Field of the Invention

The present invention relates to a data processing apparatus and a power saving control method of the same, and more particularly, to processing when transiting to a power saving state.

2. Description of the Related Art

Conventionally, as a technique of saving power of an apparatus, there is well known a technique in which an apparatus transits to a power saving state when a predetermined condition such as a condition that no data is input for a predetermined period of time is satisfied. In Japanese Patent Laid-open No. 2006-25212, for example, if no request is externally input for a preset period of time, the control unit of an apparatus controls to transit to a power saving state. In the power saving state, power supply to the CPU of the control unit is stopped, and the CPU stops communication processing.

When software different from an operating system performs the above-described power saving control in a computer device or the like, the following situation may occur. That is, if the computer device receives data from an external apparatus, and the received data is data to which the operating system should respond, the operating system tries to respond to the data. At this time, however, if the software does not know about this, and a condition for transiting to a power saving state is satisfied, the computer device unwantedly transits to a power saving state. Therefore, the computer device may transit to a power saving state while the operating system cannot respond to the data.

SUMMARY OF THE INVENTION

An aspect of the present invention is to eliminate the above-mentioned problems in the conventional technology.

The feature of the present invention is to monitor communication of an operating system to control a power saving.

According to an aspect of the present invention, there is provided a data processing apparatus comprising: a monitoring unit, configured to monitor reception of data by an operating system via a network, the monitoring unit being outside of the operating system; and a power saving unit configured to control transition to a power saving state in which the operating system is disabled to respond to data received via the network, the power saving unit being outside of the operating system, wherein when the monitoring unit detects reception of data to which the operating system should respond, the power saving unit defers transition to the power saving state.

According to an aspect of the present invention, there is provided a power saving control method for a data processing apparatus, comprising: a monitoring step of, outside of an operating system, monitoring reception of data by the operating system via a network; a power saving control step of, outside of the operating system, controlling transition to a power saving state in which the operating system is disabled to respond to data received via the network; and a control step of deferring, when reception of a packet to which the operating system should respond is detected in the monitoring step, transition to the power saving state.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart for describing processing executed by the monitoring application of the MFP according to the embodiment.

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that an MFP (multi-functional processing apparatus) is exemplified as a data processing apparatus in the following embodiments. The present invention, however, is not limited to this, and is also applicable to an information processing apparatus such as a communication apparatus or PC, a display device, a printing apparatus, or the like.

Figure 1:
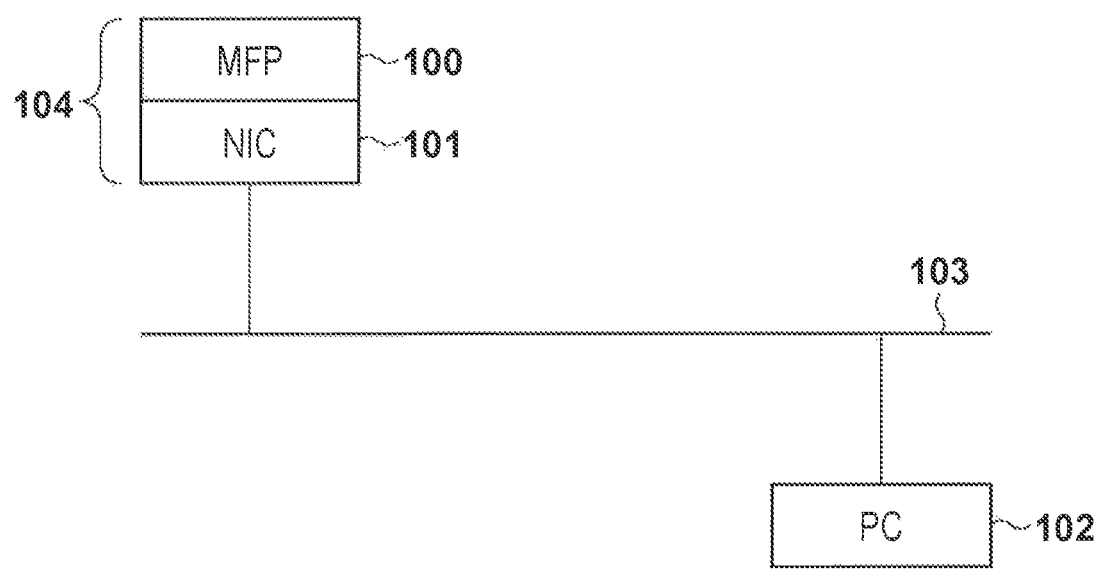
FIG. 1 depicts an overall view showing a communication system, according to an embodiment of the present invention.

FIG. 1 depicts an overall view showing a communication system according to an embodiment of the present invention.

An MFP (multi-functional peripheral equipment) 100 is connected to a LAN 103 via a NIC (Network Interface Card) 101. Assume that the LAN 103 is a general LAN (Local Area Network) such as Ethernet®. The LAN 103 may be a wireless LAN or the like. Assume also that the LAN 103 is connected with a plurality of PCs (Personal Computers) in addition to a PC 102, which is not shown in FIG. 1, because this is not directly related to this embodiment. The MFP 100 and the NIC 101 are connected with each other by an extended bus architecture for a computer, such as a PCI bus, and look as if they were a single device. The MFP 100 and the PC 102 will be collectively referred to as an image forming system 104 in this embodiment.

Figure 2:
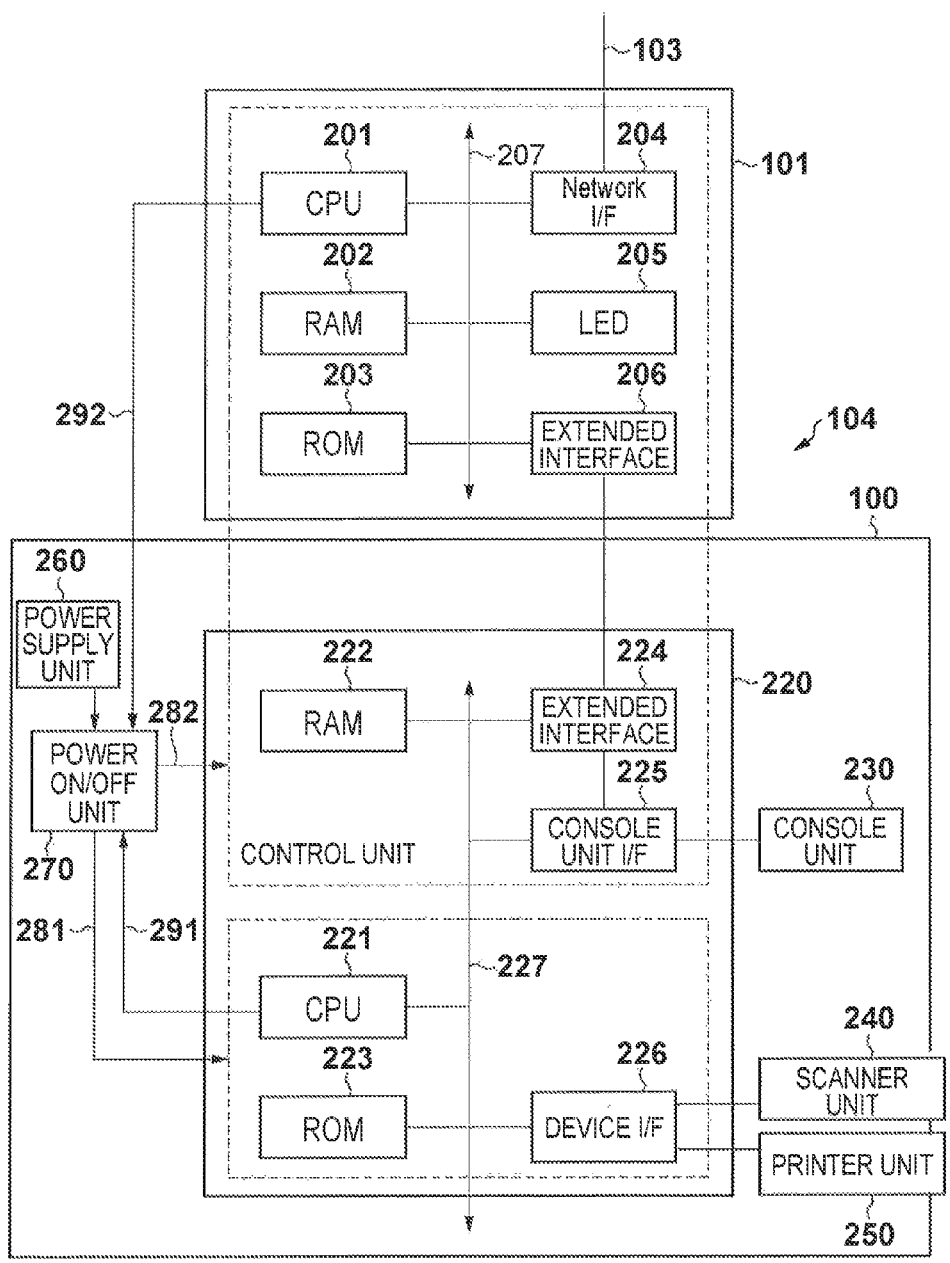
FIG. 2 is a block diagram for explaining the configuration of an image forming system according to the embodiment.

FIG. 2 is a block diagram for explaining the configuration of the image forming system 104 according to the first embodiment.

The NIC 101 serves as a network interface device detachable from the MFP 100, which is implemented by an intelligent type network card module. The NIC 101 includes a CPU 201, RAM 202, ROM 203, network I/F 204, LED 205, and extended interface 206 for itself, and a system, bus 207 for interconnecting the above components. The CPU 201 executes various control processes according to control programs stored in the ROM 203. For example, the CPU 201 connects to the LAN 103 via the network I/F 204 connected with the system bus 207, and communicates with the PC 102 on the LAN 103 via the LAN 103 according to a predetermined communication protocol. With this processing, for example, the NIC 101 can receive various kinds of data such as print data and print control instructions transmitted from the PC 102, and transfer the data to the MFP 100 via the extended interface 206, thereby executing print processing in the MFP 100. The RAM 202 is used as the main memory of the CPU 201 and a temporary storage area such as a work area. The LED 205 is used as a display unit which indicates the operation state of the NIC 101. The LED 205 can indicate various kinds of operation states such as a communication mode and an electrical connection state between the network I/F 204 and the LAN 103 by its colors and flickering patterns. The extended interface 206 is used, to connect the NIC 101 with the MFP 100, and is connected with a PCI (Peripheral Component Interconnect) bus, as described, above.

The configuration of the MFP 100 will be described next.

The MFP 100 includes a control unit 220, a console unit 230, a scanner unit 240, and a printer unit 250. The control unit 220 includes a CPU 221, RAM 222, ROM 223, extended interface 224, console unit I/F 225, and device I/F 226 for the MFP 100, and a system bus 227 for interconnecting the above components. The CPU 221 reads out control programs stored in the ROM 223 to execute various control processes. For example, the CPU 221 generates print image data based on print data transferred from the NIC 101 via the extended interface 224, and outputs the generated data to the printer unit 250 via the device I/F 226 to print it. The RAM 222 provides the main memory of the CPU 221, a work area, and the like. The RAM 222 can increase its memory capacity by an optional RAM connected to an expansion port (not shown). In the console unit 230, buttons for operations such as setting of an operation mode of the MFP 100 and cancellation of print data, a display unit such as a liquid crystal panel or LED for indicating the operation state of the MFP 100, and the like are arranged. It is also possible to set a communication mode (to be described later) through the console unit 230. The printer unit 250 is a printer using a known print technique, and prints image data by, for example, an electrophotographic method, an inkjet method, a sublimation type (thermal transfer) method, or the like. The scanner unit 240 reads an image on a document to generate image data, and inputs it to the MFP 100. Note that the MFP 100 has a power saving state in which power consumption is smaller than that in a standby state. A deep sleep state will be described below as an example of the power saving state. During the deep sleep state, power consumption is reduced by stopping power supply to each unit other than specific units (the console unit 230, extended interface 224, and the like).

A power ON/OFF unit 270 supplies an electric power supplied from a power supply unit 260 to each unit through lines 281 and 282. In the deep sleep state, the power ON/OFF unit 270 supplies an electric power through the line 282 but stops power supply from the line 281. The power ON/OFF unit 270 supplies an electric power through both the lines 281 and 282 except in the deep sleep state. Note that the power ON/OFF unit 270 supplies an electric power to the printer unit 250 in printing, and supplies an electric power to the scanner unit 240 in scanning, which is not shown in FIG. 2.

The CPU 221 controls the power ON/OFF unit 270 by transmitting a control signal to the power ON/OFF unit 270 through a line 291. The CPU 201 of the NIC 101 controls the power ON/OFF unit 270 by transmitting a control signal to the power ON/OFF unit 270 through a line 292.

Figure 3:
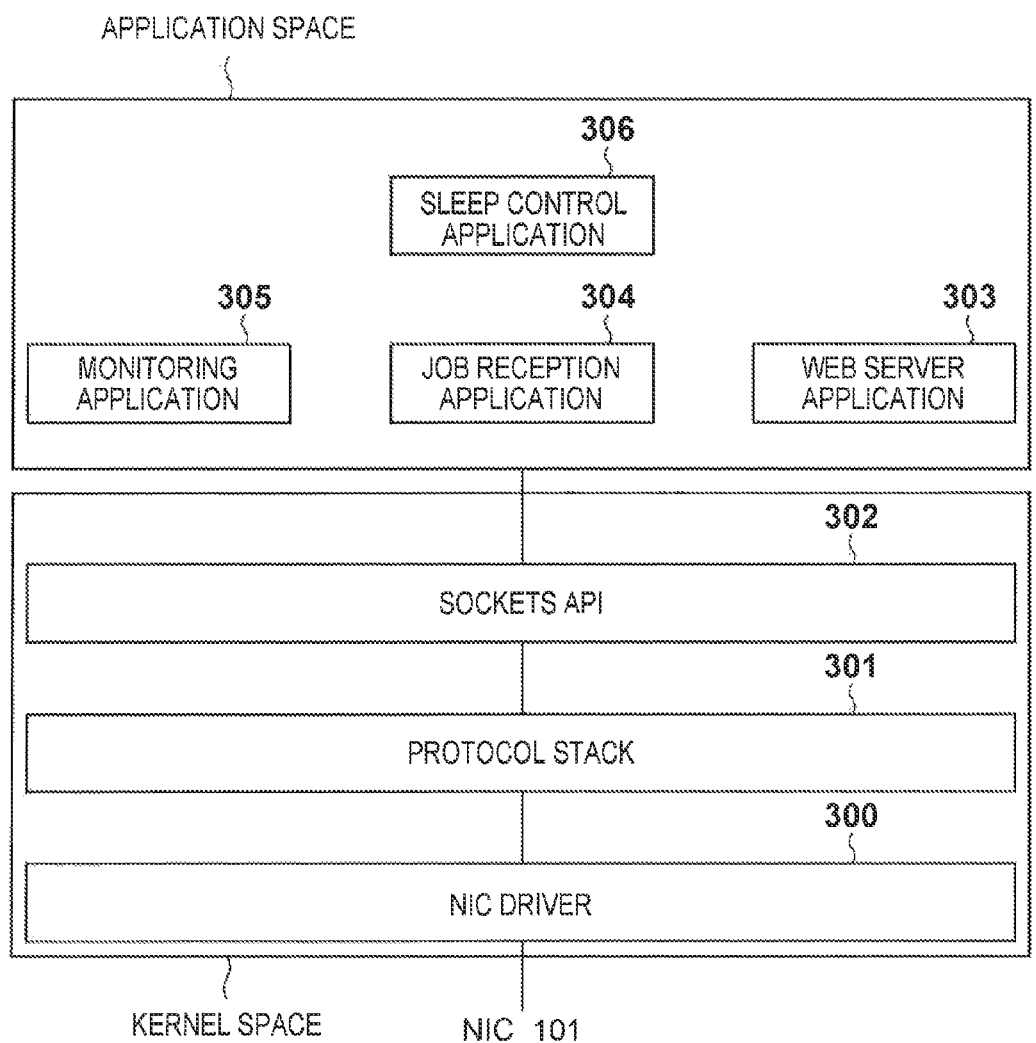
FIG. 3 is a block diagram for explaining the software configuration of an MFP (Multi Function Peripheral)

FIG. 3 is a block diagram for explaining the software configuration of the MFP 100.

A NIC driver 300 serves as a device driver for controlling the NIC 101. When various kinds of software operating on the MFP 100 control the MFP 100, the control operation is executed via the NIC driver 300. A protocol stack 301 supports a protocol used in a general LAN, such as TCP/IP (Transmission Control Protocol/Internet Protocol), UDP/IP (User Datagram Protocol/Internet Protocol), or ICMP (Internet Control Message Protocol). A sockets API (Application Program Interface) 302 is a general one provided by an OS (Operating System).

A Web server application 303 serves as a Web server. A job reception application 304 accepts a print job received by the NIC 101. For example, a print job transmitted from the PC 102 to the image forming system 104 is received by the job reception application 304 via the LAN 103. When the protocol stack 301 performs communication, a monitoring application 305 then monitors communication data. A sleep control application 306 controls processing of transiting to a deep sleep state, and inquires, of the above-described applications 303 to 305, at regular intervals whether it is possible to transit to a deep sleep state. Upon receiving the inquiry, each application returns information indicating a transition enable state if a predetermined deep sleep transition condition is satisfied, and returns information indicating a transition disable state if the transition condition is not satisfied. Upon receiving the information indicating a sleep transition enable state from all the applications as inquiry destinations, the sleep control application 306 causes the image forming system 104 to transit to a deep sleep state. In the processing of transiting to a deep sleep state, the sleep control application 306 transmits a control signal to the power ON/OFF unit 270.

In this embodiment, the protocol stack 301 and sockets API 302 are defined as an OS as in a general case. Assume that the OS and the NIC driver 300 operate in a kernel space. Assume also that other applications 303 to 306 operate in an application space. Note that a number of other applications for operating as the image forming system operate in the user space of the MFP 100, which will not be particularly described in this embodiment.

Processing when the monitoring application 305 monitors network communication executed by the OS itself will be explained with reference to a software block diagram shown in FIG. 4. The network communication to be monitored by the monitoring application 305 is a protocol such as ICMP which is generally held by the OS as a function.

Figure 4:
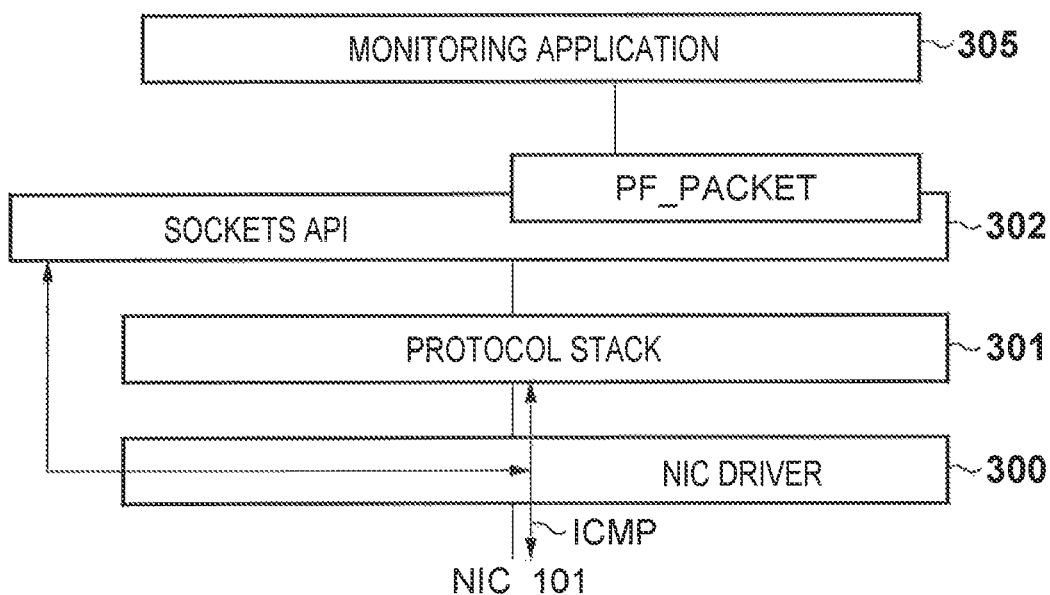
FIG. 4 is a block diagram for explaining the relationship between an OS and a monitoring application according to the embodiment.

FIG. 4 is a block diagram for explaining the relationship between the monitoring application 305 and the OS.

A problem arises when the image forming system 104 transits to a deep sleep state upon receiving an ICMP packet (for example, a ping (Packet Internet Groper) from the PC 102 on the LAN 103. More specifically, if the image forming system 104 transits to a deep sleep state while the protocol stack 301 analyzes an ICMP packet or executes response processing for the ICMP packet, the analysis operation or the response processing is stopped, and therefore, no response packet is sent to the LAN 103.

In this embodiment, if the monitoring application 305 monitors a transmission/reception status of an ICMP packet, and the protocol stack 301 is processing the ICMP packet, the system 104 is controlled not to transit to a deep sleep state. The monitoring application 305 operates using a so-called PF PACKET socket. This is also called a packet socket, and enables to transmit/receive a packet at the device driver level. That is, it is possible to transmit/receive a packet at Layer 2 of the OSI (Open Systems Interconnection) reference model, which means that it is possible to transmit/receive all data in the Ethernet frame. Using a PF_PACKET socket, it becomes possible to monitor all network frames via the NIC driver 300 at the network interface level.

A processing procedure when the monitoring application 305 actually performs packet monitoring to control a power saving will be described with reference to a flowchart shown in FIG. 5.

FIG. 5 is a flowchart for describing processing executed by the monitoring application of the MFP 100 according to the embodiment. A program for executing this processing is stored in the ROM 223, and is executed under control of the CPU 221.

The sleep control application 306 determines whether or not a predetermined condition for transiting to a sleep mode such as a condition that predetermined data (a packet) is not input for a predetermined period of time is satisfied. If the predetermined condition, is satisfied, the application 306 causes the MFP 100 to transit to a sleep mode. It is assumed here that if the predetermined condition is satisfied but the application 306 receives information indicating a sleep transition disable state from the monitoring application 305, the application 306 operates not to perform transition to a sleep mode until the sleep transition disable state is cancelled.

In step S501, the monitoring application 305 starts to monitor a port using a packet socket, as described above. The process advances to step S502, and the monitoring application 305 determines whether a packet has been received. If it is determined that a packet has been received, the process advances to step S503, and the monitoring application 305 transmits information indicating a sleep transition disable state to the sleep control application 306. This causes the sleep control application 306 not to perform transition to a sleep state. In step S503, the received packet is analyzed. In step S504, it is determined whether the received packet is to be processed by the OS or application. This determination operation is executed by referring to information indicating the type of protocol contained in the packet data and information indicating a port number. If it is determined in step S504 that the received packet is not to be processed by the OS, the process advances to step S506; otherwise, the process advances to step S505. In step S505, the monitoring application 305 stands by (waits) for a predetermined period of time (300 ms in this embodiment). That is, the application 305 prolongs a time until the transition to a sleep mode is performed. After that, the process advances to step S506, and the monitoring application 305 transmits information for cancelling the sleep transition disable state to the sleep control application 306.

In this manner, when the received packet, is to be processed by the OS, the sleep control application 306 deters causing the image forming system 104 to transit to a deep sleep state. Note that the information for cancelling the sleep transition disable state may be information indicating a change from the sleep transition disable state to a sleep transition enable state or information simply indicating a sleep transition enable state.

As described above, when it is detected that a packet to be processed by the OS has been received, the OS can securely process the packet before entering a sleep state by standing by for a given period of time and then notifying that transition, to a sleep state is possible.

According to this embodiment, as described above, a monitoring application as a software module operating in an application space monitors communication made by an OS operating in a kernel space, and considers the communication status of the OS, thereby determining whether it is possible to transit to a sleep state. This can solve the problem, without changing the OS, that the apparatus enters a deep sleep mode while the OS is communicating.

OTHER EMBODIMENTS

In step S505 of FIG. 5, a monitoring application 305 stands by for a predetermined period of time. Instead of standing by for a predetermined period of time, the application 305 may stand by until completion of processing of a packet.

In step S504 of FIG. 5, the monitoring application 305 determines whether or not a received packet is to be processed by an OS. The determination operation in step S504, however, may be omitted. That is, when a packet is received, it may be determined that there is a possibility that the received packet is to be processed by the OS, and processing in steps S505 and S506 may be executed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, residing out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-032631, filed Feb. 17, 2011 which is hereby incorporated by reference herein in its entirety.

What is claimed is:

1. A data processing apparatus comprising:
a memory configured to store a plurality of application programs and an operating system for controlling communications between the plurality of application programs and a hardware of the data processing apparatus, the plurality of application programs including a sleep control application for transition from a first power state to a second power state that consumes less power than that in the first power state and a monitoring application for monitoring communication between the operating system and an external apparatus via a network; and
a processor configured to execute the plurality of application programs and the operating system,
wherein the operating system includes data monitoring software for notifying the monitoring application that the operating system receives data from the external apparatus and data processing software for processing the data received from the external apparatus,
wherein if the monitoring application receives a notification from the data monitoring software and determines that the data is to be processed by the data processing software, the monitoring application instructs the sleep control application not to transit from the first power state to the second power state while the data processing software is processing the data, and
wherein when the sleep control application receives an instruction from the monitoring application, the sleep control application does not transit the data processing apparatus from the first power state to the second power state while the data processing software is processing the data.

2. The apparatus according to claim 1, wherein the data to be processed by the data processing software is an ICMP packet.

3. The apparatus according to claim 1, wherein the data monitoring software is a packet socket.

4. The apparatus according to claim 1, wherein if the monitoring application receives the notification from the data monitoring software and determines that the data is to be processed by the data processing software, then the monitoring application instructs the sleep control application not to transit the data processing apparatus from the first power state to the second power state for a predetermined time period, and after an elapse of the predetermined time period, the monitoring application instructs the sleep control application to transit the data processing apparatus from the first power state to the second power state.

5. A power saving control method for a data processing apparatus having a memory configured to store a plurality of application programs and an operating system for controlling communications between the plurality of application programs and a hardware of the data processing apparatus, the plurality of application programs including a sleep control application for transition from a first power state to a second power state that consumes less power than that in the first power state and a monitoring application for monitoring communication between the operating system and an external apparatus via a network; and a processor configured to execute the plurality of application programs and the operating system, wherein the operating system includes data monitoring software for notifying the monitoring application that the operating system receives data from the external apparatus and data processing software for processing the data received from the external apparatus, the method comprising:

receiving, for the monitoring application, a notification from the data monitoring software and determining that the data is to be processed by the data processing software; and instructing, for the monitoring application, the sleep control application not to transit from the first power state to the second power state while the data processing software is processing the data, wherein the sleep control application receives an instruction from the monitoring application and does not transition the data processing apparatus from the first power state to the second power state while the data processing software is processing the data.

6. The apparatus according to claim 1, wherein the monitoring application determines whether the packet received from the external apparatus is to be processed by the data processing software by referring to information indicating a type of protocol contained in the data received from the external apparatus or information indicating a port number in the data received from the external apparatus.

7. The apparatus according to claim 1, further comprising a scanner unit or a printer unit.

8. The apparatus according to claim 1, wherein the data monitoring software is an API (Application Program Interface) included in the operating system.

9. The apparatus according to claim 1, wherein the data monitoring software is able to detect data passed through a device driver for controlling a network interface that receives data from the external apparatus, and the data monitoring software notifies the monitoring application of that the data is received from the external apparatus when the data monitoring software detects the data passed through the device driver.

10. The apparatus according to claim 9, wherein the operating system includes the device driver.

11. The apparatus according to claim 1, wherein the data processing software is a protocol stack capable of processing data being compliant with a plurality of protocols supported by the operating system.

12. The apparatus according to claim 1, wherein if the monitoring application receives the notification from the data monitoring software and determines that the data is to be processed by the data processing software, then the monitoring application instructs the sleep control application not to transit the data processing apparatus from the first power state to the second power state, and after the data processing software has completed processing of the data, the monitoring application instructs the sleep control application to transit the data processing apparatus from the first power state to the second power state.

13. The apparatus according to claim 1, wherein the sleep control application and the monitoring application are executed in an application space and the data monitoring software and the data processing software are executed in a kernel space.

* * * * *